United States Patent [19]

Luebke

[11] Patent Number: 5,105,111

[45] Date of Patent: Apr. 14, 1992

[54] ELECTRICAL MACHINE ESPECIALLY A D-C MOTOR

[76] Inventor: Ben Luebke, 5205 Babcock St., NE., Palm Bay, Fla. 32905

[21] Appl. No.: 533,450

[22] Filed: Jun. 5, 1990

[51] Int. Cl.⁵ .......................................... H02K 37/00
[52] U.S. Cl. ..................................... 310/46; 310/154; 310/198; 310/208; 310/232; 310/248; 310/254; 310/261
[58] Field of Search ............... 310/152, 154, 153, 208, 310/198, 261, 46, 42, 177, 232, 233, 237, 136, 148, 254, 248, 180, 156, 184, 206

[56] References Cited

U.S. PATENT DOCUMENTS

| | | | |
|---|---|---|---|
| 1,950,753 | 3/1934 | Scofield | 310/152 |
| 1,950,754 | 3/1934 | Scofield | 310/152 |
| 2,844,744 | 7/1958 | Meier | 310/46 |
| 3,173,043 | 3/1965 | Newill | 310/128 |
| 3,287,676 | 11/1966 | Davis | 310/154 |
| 3,602,749 | 8/1971 | Esters | 310/154 |
| 3,603,823 | 9/1971 | Mason | 310/128 |
| 3,801,833 | 4/1974 | Leitgeb | 310/208 UX |
| 3,828,213 | 8/1974 | Yamashita | 310/154 |
| 3,836,801 | 9/1974 | Yamashita | 310/154 |
| 3,883,633 | 5/1975 | Kohler | 310/152 |
| 3,886,385 | 5/1975 | Bacchialoni | 310/152 |
| 4,703,212 | 10/1987 | Aboukart | 310/154 |
| 4,947,071 | 8/1990 | Clarke | 310/46 |
| 4,995,159 | 2/1991 | Hancock | 310/42 |

FOREIGN PATENT DOCUMENTS 2129388 12/1972 Fed. Rep. of Germany ...... 310/128

Primary Examiner—R. Skudy
Attorney, Agent, or Firm—Herbert Dubno; Yuri Kateshov

[57] ABSTRACT

A direct - current electric machine includes a rotor rotatable about an axis of rotation and a stator formed with a plurality of locations angularly equispaced thereon and provided with a respective array of horseshoe magnets extending over 180° about a respective helical coil wounded on a coil axis defined by a respective pair of arms mounted on the rotor and coinciding with a tangent to a circle centered in the axis of rotation.

15 Claims, 9 Drawing Sheets

ELECTRICAL MACHINE ESPECIALLY A D-C MOTOR

FIELD OF THE INVENTION

My present invention relates to an electric machine and, more particularly, to a direct current electrical machine such as a motor or generator which, in its best mode embodiment, can be a low-voltage electric motor capable of generating high torques and high speeds and which can be used, for example, in a solar powered vehicle.

BACKGROUND OF THE INVENTION

Electric machines in which the turns of a coil cut through a mechanical field have heretofore generally utilized permanent magnets and/or electromagnets to produce the field and coils which cut through the magnetic field generated by the permanent magnets and/or electromagnets and have been constructed so as to maximize the number of turns which can intercept the lines of force transversely.

Such machines, for example, electric motors, can have the poles of the stator magnets so positioned that the lines of force between them run perpendicular or crosswise to the axis of the coil, i.e. approximately parallel to the plane of a turn of the coil.

Reference may be had in that regard to the following U.S. Pat. Nos.:

| | |
|---|---|
| 3,602,749 | 3,287,676 |
| 4,703,212 | 3,836,801 |
| 3,828.213 | 3,883.633. |

These principles apply not only to the rather complex arrangements of rotor coils (armature coils) and stator magnets described in these patents but also to systems in which the stator magnets can lie in axial planes of the rotor or armature or which can have their opposite poles in such planes so that the major direction of the lines of force between the opposite poles of a given magnet is parallel to the axis of the armature.

There are motor arrangements known in which the opposite poles of the magnet are spaced apart in the peripheral direction, i.e. are angularly spaced about the axis of the rotor in a plane which is perpendicular to the axis, i.e. a radial plane of the motor, but, in those cases, the coils tend to be wound so that their axes lie in axial planes and are perpendicular to the axis of the rotor.

With all of these arrangements the so-called back electromagnetic force (back EMF) is high and as a consequence, to provide the requisite torques, high voltages must be applied to secure the necessary power output.

Furthermore, these earlier systems are characterized by a high degree of induction and substantial stray induction which can lead to direct current losses and excess heating of the motor.

OBJECT OF THE INVENTION

It is, therefore, the principal object of the present invention to provide an improved electrical machine whereby these disadvantages are avoided.

Another object of the invention is to provide an electrical machine having a rotor and a stator whereby the back EMF is reduced, induction losses are minimized and a greater portion of the supply electrical energy is converted into useful work.

Still another object of the invention is to provide a high torque, high output electric motor which can be driven at low voltages and which is free from the disadvantages outlined above.

Still another object of the invention is to provide an electric motor which is especially suitable for use in solar powered vehicles.

SUMMARY OF THE INVENTION

These objects and others which will become apparent hereinafter are attained, in accordance with the invention in a D-C electric machine in which a rotor member and a stator member are provided and one of these members is provided with at least one cluster of horseshoe-type permanent magnets, all of the poles of which on the same side of the path have the same polarity, and a coil is disposed at least intermittently within the cluster and has an axis lying generally along a chord or tangent of an imaginary circle centered on the axis of rotation of the rotor and such that the axis of the coil lies in a radial plane, i.e. a plane perpendicular to the axis of rotation of the rotor, while the permanent magnets of the cluster lie generally in axial planes of the axis of the coil when it is in position within the cluster.

Since the like poles of all of the permanent magnets are either at the upstream side or the downstream side of the cluster with respect to the path of the coil through the cluster upon relative displacement of the rotor and stator, the field lines do not run primarily between the neighboring poles of the magnets but rather run parallel to the field lines of the other magnets through the coil in the direction of displacement, i.e. generally in the direction in which the coil axis extends. The coil itself may be a multilayer helical coil in which the turns substantially completely fill the cross section so that, if a core is provided, the field lines from each of the permanent magnets are confined outwardly of this core.

This unique construction of the coil and permanent magnetic cluster, according to the invention, has been found to eliminate inductive losses practically entirely and presumably is a major factor in the substantial reduction in the back EMF of an electrical machine according to the invention by comparison with machines having magnets generating similar field strength and using coils with equivalent ampere turns.

More specifically, the electrical machine of the invention can comprise two relatively movable parts which can be a rotor and a stator and a magnetic drive system which comprises in combination:

a helical-turn electromagnet coil on one of the parts and having a coil axis lying in a plane; and a cluster of at least two generally horseshoe-shaped permanent magnets on the other of the parts and surrounding end the coil in one relative position of the parts, the permanent magnets being angularly spaced about the coil axis and lying generally in axial plane-s thereof with respective poles disposed across the coil from each other in the position having the same magnetic polarity.

While the theory which explains the results obtained with the machine of the invention has not yet been fully elucidated, it appears that the unique results are due in large measure to the unique interaction between the lines of force of the permanent magnets of the cluster and the coil so that there is a minimum of inductive loss.

While the principal of the invention is applicable to any electrical machine, e.g. a generator or motor, I prefer to embody the invention in the form of a motor having a plurality of permanent magnetic clusters surrounding the axis and an equal number of magnetic coils angularly equispaced on a nonferromagnetic disk of the rotor and to provide the clusters so that the permanent magnets of each of them are angularly equispaced about the axis of a coil when the latter is positioned in the cluster.

More particularly, therefore, the electrical machine of the invention can comprise:

a rotor member rotatable about an axis of rotation;

a stator member juxtaposed with the rotor member and centered on the axis;

a helical-turn electromagnet coil on one of the members and having a coil axis lying in a radial plane of the rotor member perpendicular to the axis of rotation and along a chord of a circle in the plane centered on the axis of rotation;

a cluster of at least two generally horseshoe-shaped permanent magnets on the other of the members and surrounding the coil in one relative angular position of the rotor member and the stator member about the axis of rotation, the permanent magnets being angularly spaced about the coil axis and lying generally in axial planes thereof with respective poles disposed across the coil from each other in the position having the same magnetic polarity; and means forming an electrical connection to the coil for extracting electrical current from or supplying electrical current to the coil.

Each cluster can have at least three generally horseshoe-shaped permanent magnets angularly spaced about the coil axis and lying generally in axial planes thereof. More specifically, each cluster can have five such horseshoe-shaped permanent magnets angularly equispaced about the coil axis and disposed symmetrically with respect to an axial plane of the coil axis.

Preferably the rotor member is provided with the coils and the stator member is provided with the permanent magnet clusters and the means forming the electrical connection includes brushes engaging the rotor member.

The stator can thus have a cage surrounding the rotor which comprises a support for a plurality of plates each of which carries a respective permanent magnet at the respective cluster while the coils can be received in outwardly open recesses formed in the disk to which the shaft is attached. The disk as well may be composed of a nonferromagnetic material.

According to a further feature of the invention, the switching of the coils, i.e. the pulsing of the coils with direct current in timed relationship with the approach of each coil to a magnetic cluster upon rotation of the rotor, can be obtained by providing a commutater array of conductors on the disk which can be engaged by brushes connected to a direct current source such as a battery which can be charged, as required, by solar cells or the like. Any other direct current source may, of course, also be used.

The coils, which can be electrically connected in series or in parallel but are preferably connected in parallel in the best mode embodiment currently known of the invention, can also be energized through slip rings, preferably also provided on the disk, engaged by brushes connected to a D-C source through a switching circuit or timing circuit which provides the pulses to the coils synchronously with the rotation of the rotor.

As noted, the motor of the invention has rather unique advantages over prior art systems in that it can be driven at very low voltages with very low back EMF and practically no inductive losses.

Utilizing a slip ring parallel connection arrangement with five permanent magnets per cluster, each able to lift about 100 pounds and coils capable of lifting 7 pounds when used as electromagnets, and with a supply voltage of 3 volts at 20 watts, a motor according to the invention was able to produce 66 inch pounds of generated force utilizing a switching circuit reversing the polarity at approximately ever 30° of rotation of the shaft.

Efforts to trace the magnetic field effects in the cluster have shown that with the permanent magnets arrayed as described, there is within the magnetic poles an inner zone in which along the axis of the coil there is practically no magnetic flux but throughout the space outwardly of this zone, i.e. the magnetic tunnel, there is very substantial flux and the coil wire is, of course, concentrated in this region.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 8:
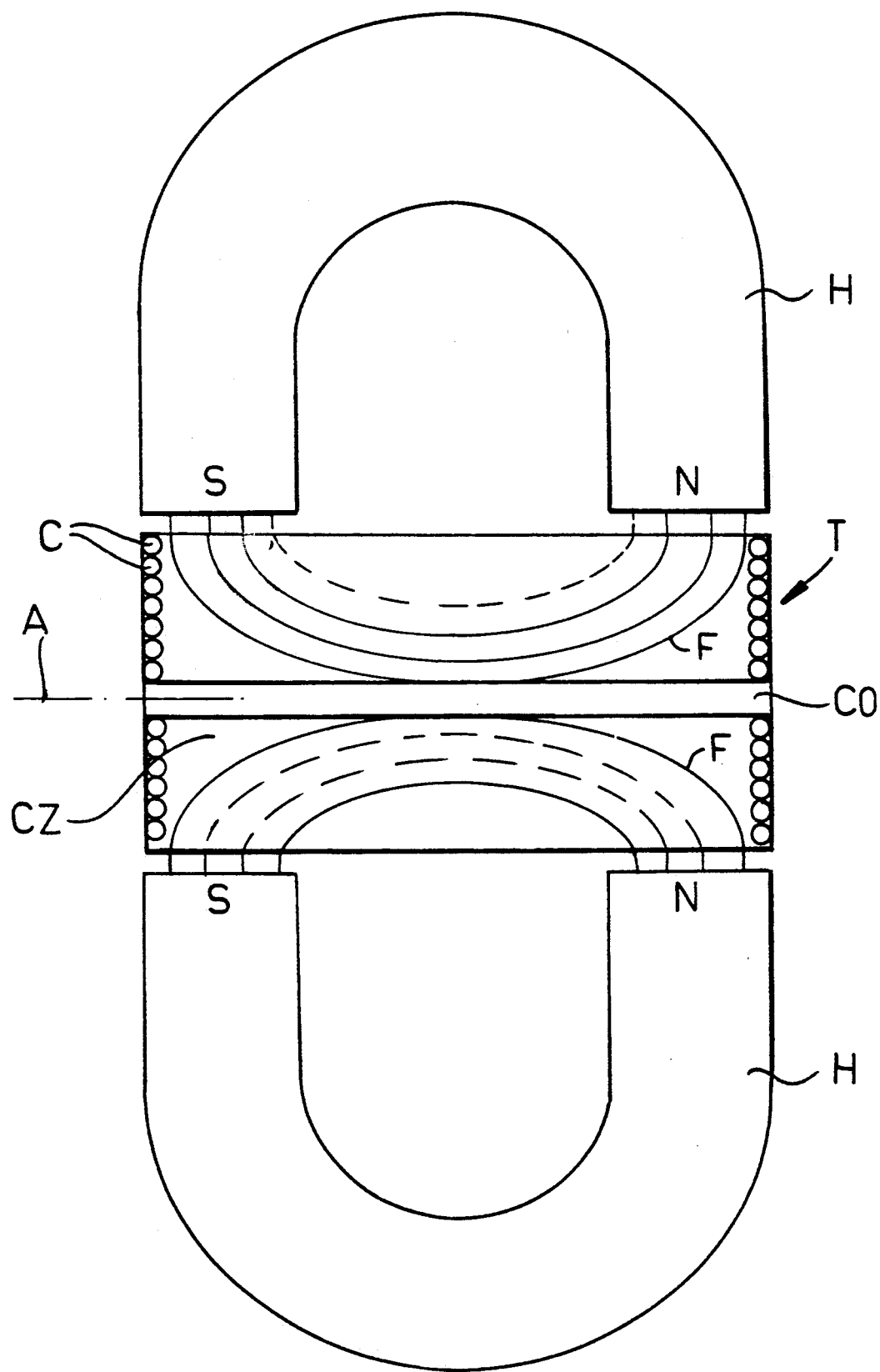
FIG. 8 is a diagram illustrating the magnetic tunnel effect of the invention.
Figure 9:
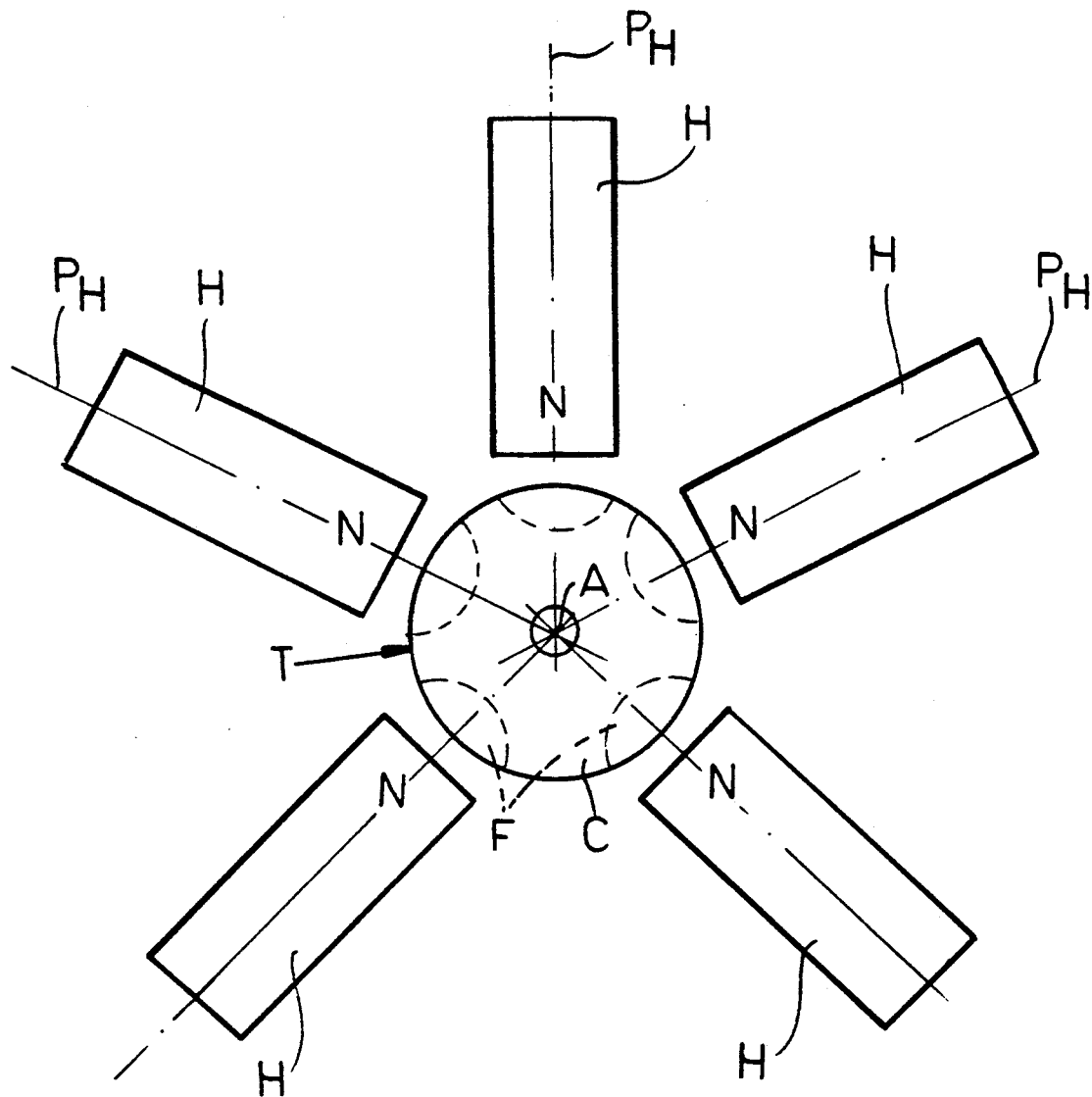
FIG. 9 is a diagram taken in a plane perpendicular to the plane of the drawing of FIG. 8 likewise illustrating the magnetic tunnel effect.

Before describing the electrical machine of the invention in the form of a motor as a whole, reference is made to FIGS. 8 and 9 which are intended to illustrate the principle which appears to be applicable to the invention.

Figure 2:
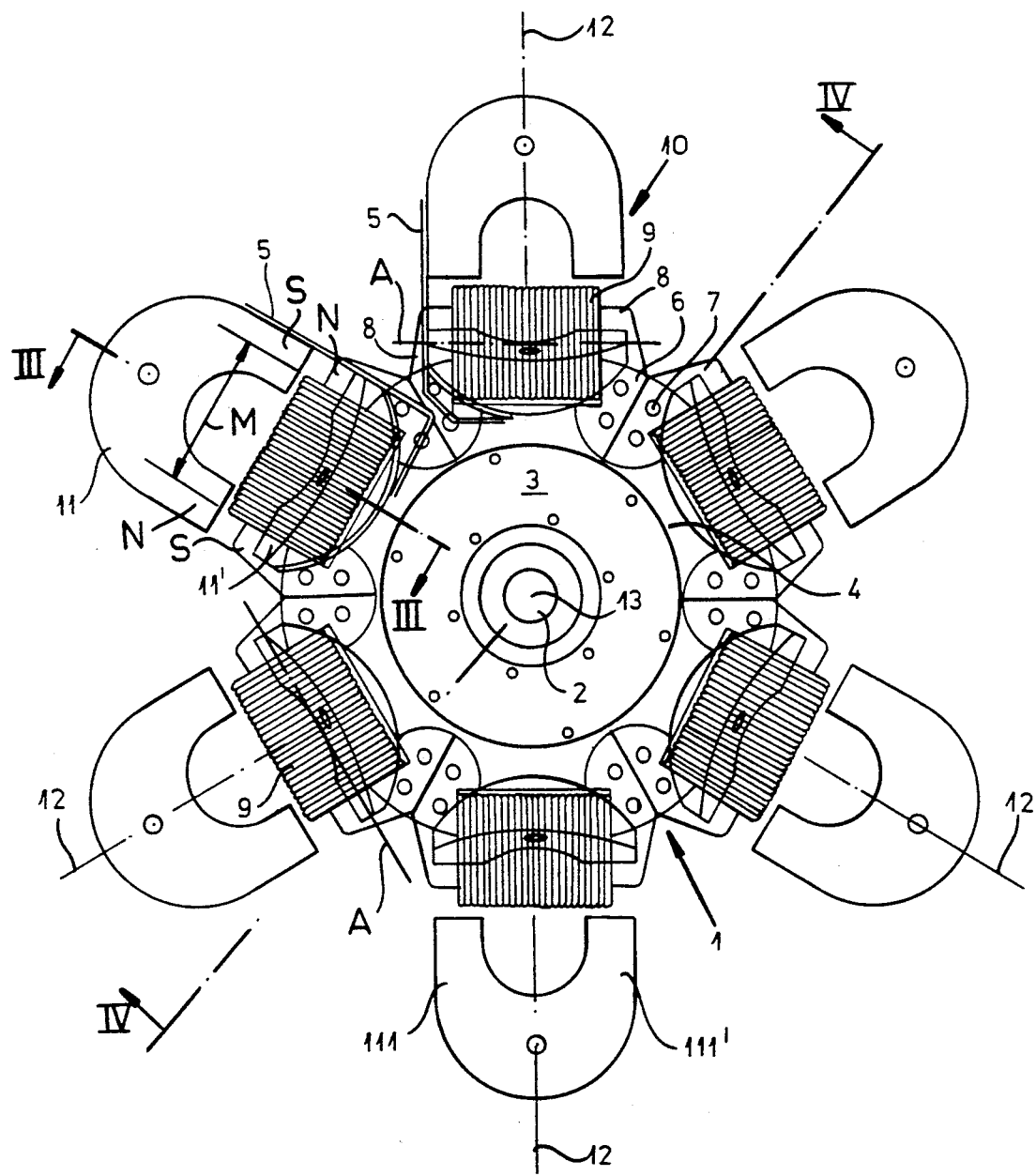
FIG. 2 is a front elevation view of the D-C machine.

Let us assume that a cluster of horseshoe type permanent magnets as illustrated in FIG. 2 is provided around a coil C whose axis is perpendicular to the plane of the paper in FIG. 9 and has been represented at A. In this case five horseshoe magnets H are shown to be disposed in respective axial planes $P_H$ of the axis A and to be angularly equispaced from one another about the axis A. The horseshoe magnets H thus extend around the coil C in an array by more than 180° and indeed this array in FIG. 9 completely surrounds the coil. As a result a magnetic tunnel T is formed within the array or cluster, through which the coil can travel. All of the magnetic poles on one side, say upstream in the direction of travel of the coil are poled the same, and all of the magnetic poles on the opposite side, say the downstream side, are poled the same.

The north poles N only of the horseshoe magnetic H are visible in FIG. 9. It will be apparent that the fields of each horseshoe magnet repels the field of the neighboring horseshoe magnet so that the field lines shown in FIG. 9 in broken lines at F run into the plane of the paper.

This can better be seen from FIG. 8 where only two of the permanent magnets have been illustrated.

Note that the field lines F of the two magnets are confined to zones proximal to the magnets and that a central zone CZ remains practically free of any magnetic field generated by the cluster.

The coil C, however, has its turns disposed primarily in the regions traversed by the magnetic fields F and the center of the coil, which may have a core CO, is substantially devoid of any field. A the coil passes through the magnetic tunnel T (FIG. 9) practically without induction losses in the core or at any other part of the system. It is this unique configuration of the mechanical tunnel produced by the permanent magnetic cluster and its interaction with the coil which appears to account for the unique effect of the invention.

Figure 1:
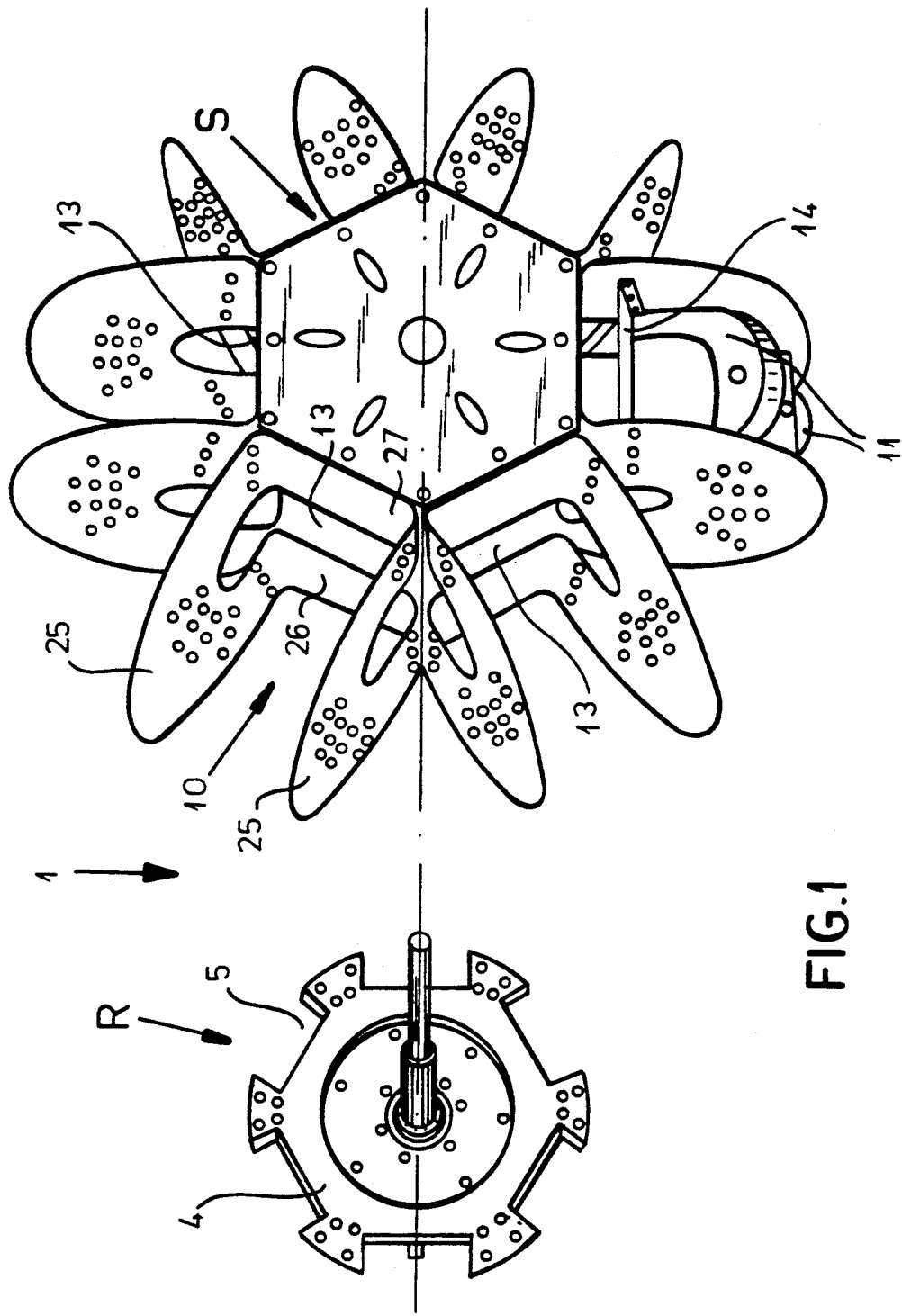
FIG. 1 is a perspective view of a stator and a rotor before assembling the D-C machine.

FIG. 1 shows a perspective view of a stator S and a rotor R before the assembly of a D-C machine namely a motor 1, is completed. The stator comprises several clusters of brackets 10 spaced angularly from one another and formed by a respective pair of side walls 25 bridged with one another by respective back walls 26. Upon the completion of assembling of the machine a flywheel 4 carrying a number of helical coils 9 is mounted in the stator in such manner that upon the rotation of the rotor "R" the coils 9 shown in FIGS. 2, 3 and 4 pass through openings 13 formed in side walls and back walls 26 or each of the clusters.

Each of the bracket clusters of the stator "S" carries a plurality of horseshoe magnets 11 extending over the respective coil 9 passing through the respective cluster protruding outward beyond the respective back walls through the openings 13. For a better illustration only one of the clusters with two horseshoe magnets mounted thereon is shown in FIG. 1. It is apparent from the drawing that each pair of the side walls is provided with a plurality of holes receiving bolts plates 14 each of which is affixed to the respective magnet.

Referring to FIG. 2, the direct - current electric machine according to the present invention, generally indicated at 1 is seen to comprise a shaft 2 journaled in bearings and rotatable about an axis of rotation with a commutator disk 3 secured to the shaft.

Mounted on the shaft is the armature plate or the flywheel 4 formed with a plurality of notches 5 angularly equispaced from one another along the periphery of the flywheel and extending inward at a distance toward the shaft.

The flywheel is provided with arms 6 preferably made out of aluminum which are spaced angularly and are fastened to the flywheel by any convenient means 7, for example rivets. Each of the arms is formed with a pair of shoulders 8 spaced from one another and extending radially outward beyond the periphery of the flywheel. Each pair of shoulders defines a bottom of the respective notch therebetween and surrounds the respective coil wound on a narrow core 27 shown in FIG. 3 centered on an axis A.

The axis "A" coincides with the tangent to a circle or a chord of a circle (imaginary) centered on an axis of rotation "B" of the rotor "R" so that the axes Δ and the respective coils orbit around the axis B.

This specific structural relationship has a critical significance for the present invention in the light of the positions of the respective magnets 11 and 11' with respect to the helical coil 9, i.e. the transverse central planes 12 of the magnets 11 and 11' are perpendicular to the coil axis A and to the tangent to the circle centered on the axis "B" of the rotor while the magnets themselves lie in axial planes of the coil C positioned within a cluster.

As is shown in FIG. 2 the flywheel 4 bears six helical coils angularly equispaced from one another. Of course, the number of the coils is not limited by this embodiment and may be varied according to the specific practical implementations of the machine.

The stator "S" of the machine 1 is provided with a plurality of clusters 10 arranged at equal angular intervals around the shaft 2 of the rotor "R" and formed with at least two elongated horseshoe shaped permanent magnet 11 having two legs 111' and 111" in each of the locations.

Advantageously each of the clusters carries an inner and outer horseshoe magnets 11 and 11" (FIG. 2) juxtaposed with one another.

Figure 3:
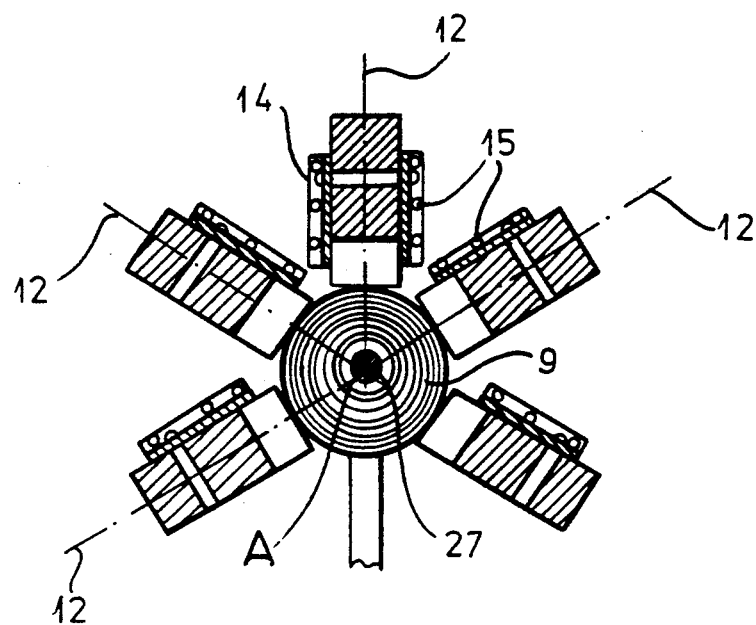
FIG. 3 is a sectional view taken along line III—III in FIG. 2.

Additionally, three more magnets are mounted in each of the clusters as it is shown in FIG. 3.

The criticality of the structure shown in FIG. 2 also includes the geometrical relationship wherein the length of the coil 9 which is generally equal to the distance "M" between respective centers of two legs of each magnet.

FIG. 2 illustrates a number of the clusters of magnets 10 which is advantageously equal to the number of notches formed on the flywheel 4. Each of the clusters comprises an array of horseshoe magnets as it is shown in FIG. 3 extending over 180° about the respective core axis A with their central planes 12 lying perpendicular to the respective core axis and to the tangent to a circle centered on the axis of rotation upon passing the helical coil through the respective array of magnets.

Thus, using the particular structural relationship between the coil and the array of magnets it is possible to surround the coil partially by a plurality of magnets increasing the magnetic field and therefore to recover more than 90% of the input energy.

The arrangement of the permanent magnets 11 at each of the locations creates a very dense magnetic tunnel for the coils 9 to pass through. Both sides of each of the electromagnets work as they pass through the tunnel. By contrast a standard electric motor in which poles usually face each other.

Based upon an experiment each end of the electromagnets lifts about 7 pounds at about 350 to 400 watts but placing them on the rotor in the field the same 350–400 watts produces 14 pounds of "lifting" power per electromagnet.

Figure 4:
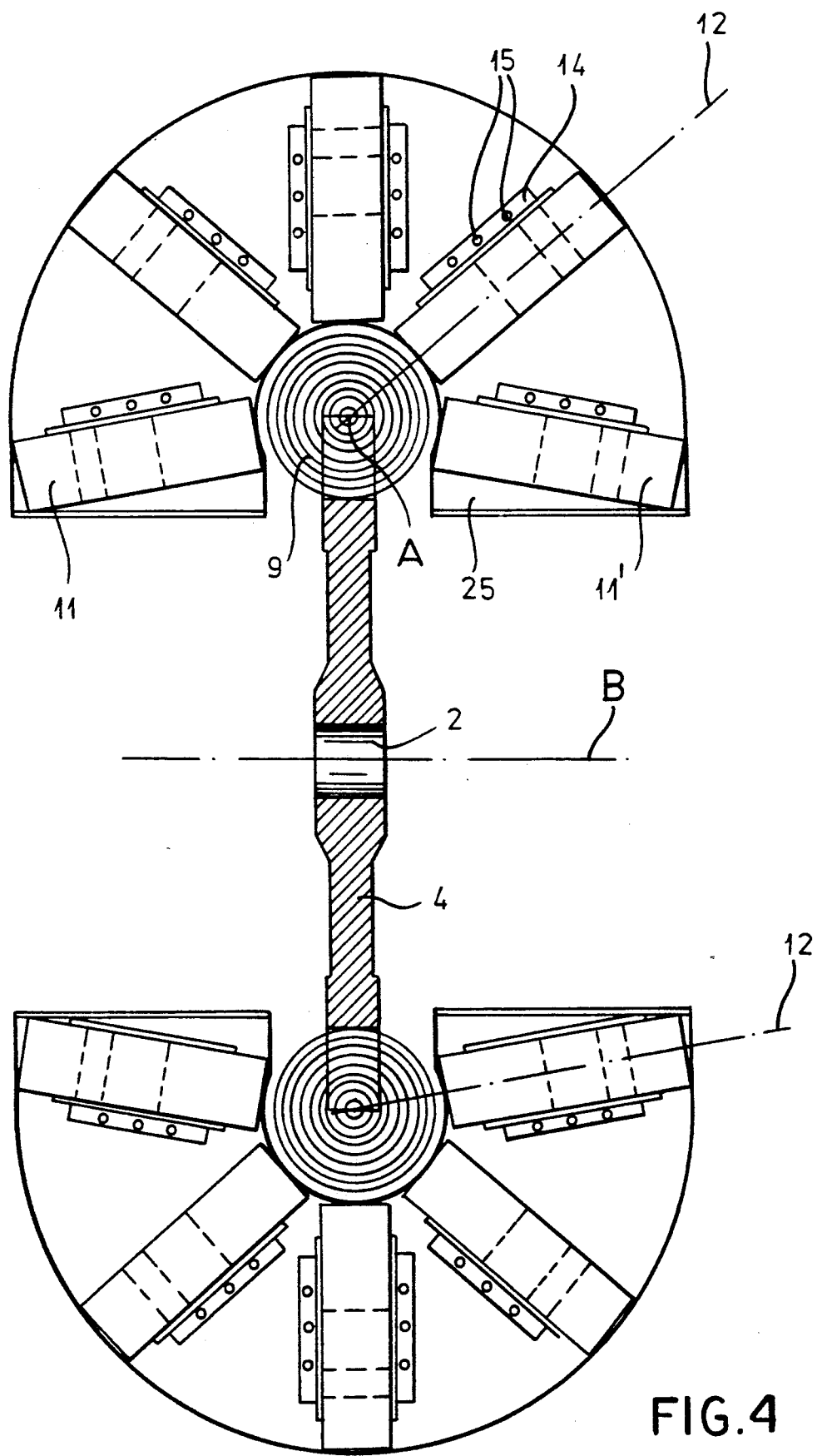
FIG. 4 is a sectional view taken along line IV—IV in FIG. 2.

The embodiment shown in FIGS. 3 and 4 has five magnets at each of the locations, but again the number of the magnets can be varied.

FIG. 3 illustrates the plates 14 provided with a plurality of bolts or the like 15 connecting the respective horseshoe magnet with the side walls 25 described in detail with respect to FIG. 1. On of the magnets of each cluster is mounted on the walls by a pair of the plates while other magnets can be fixed to the walls by only one plate.

The flywheel or armature plate is made out of a non-magnetizable material while the helical coil preferably contains wires of 99.99% fine silver reducing the resistance.

Figure 5:
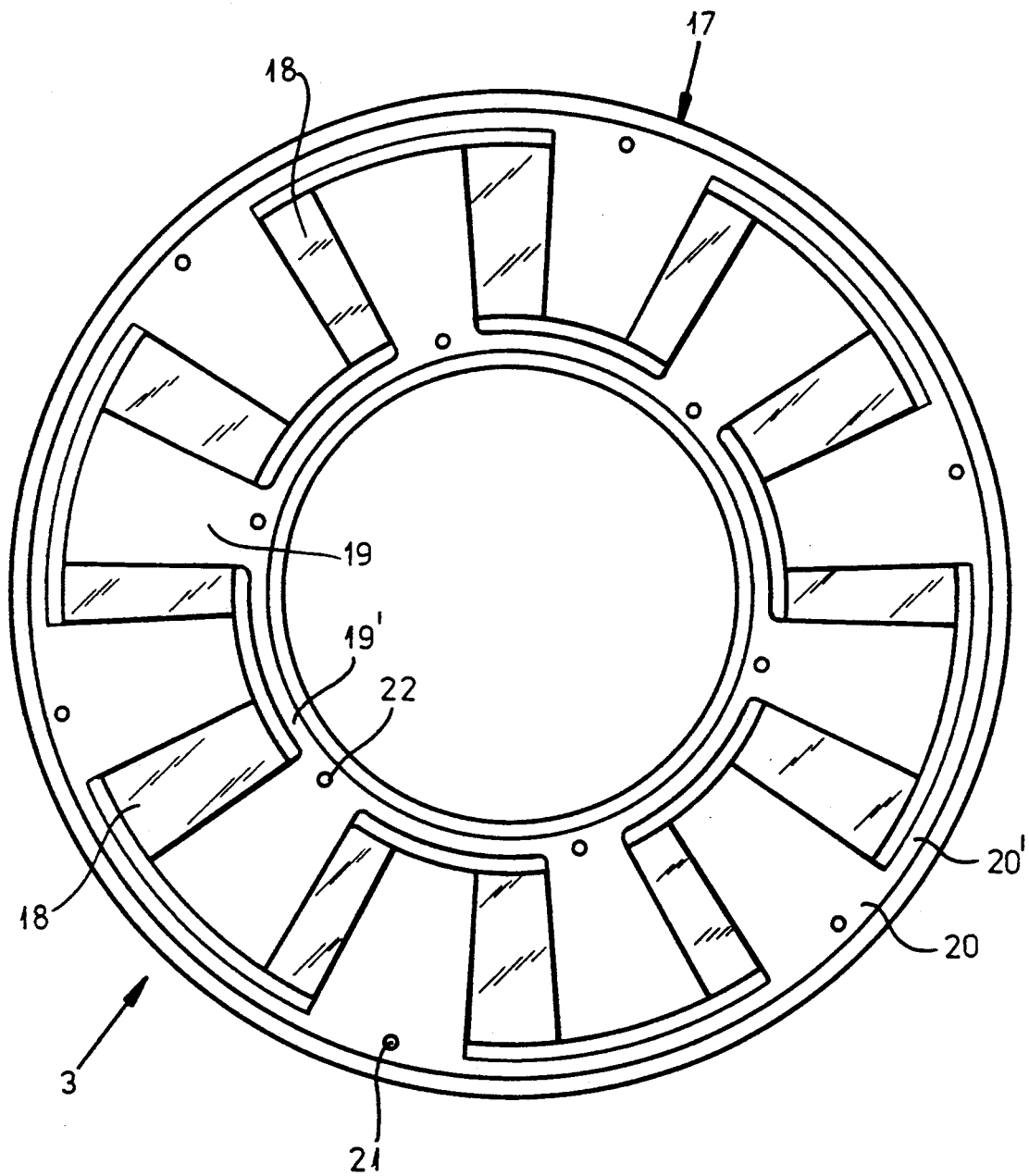
FIG. 5 is a circuit diagram of the commutation according to the invention.

Referring to FIG. 5, the commutator disk 3 secured to the shaft is formed of a rigid material and is provided with a plurality of segments 18 spaced angularly from one another and defining separate zones 19 and 20 therebetween which are not interconnected. Each of the zones 19 and 20, however, is continuous and is composed of a plurality of arcuate radial regions 19' and 20'.

Figure 6:
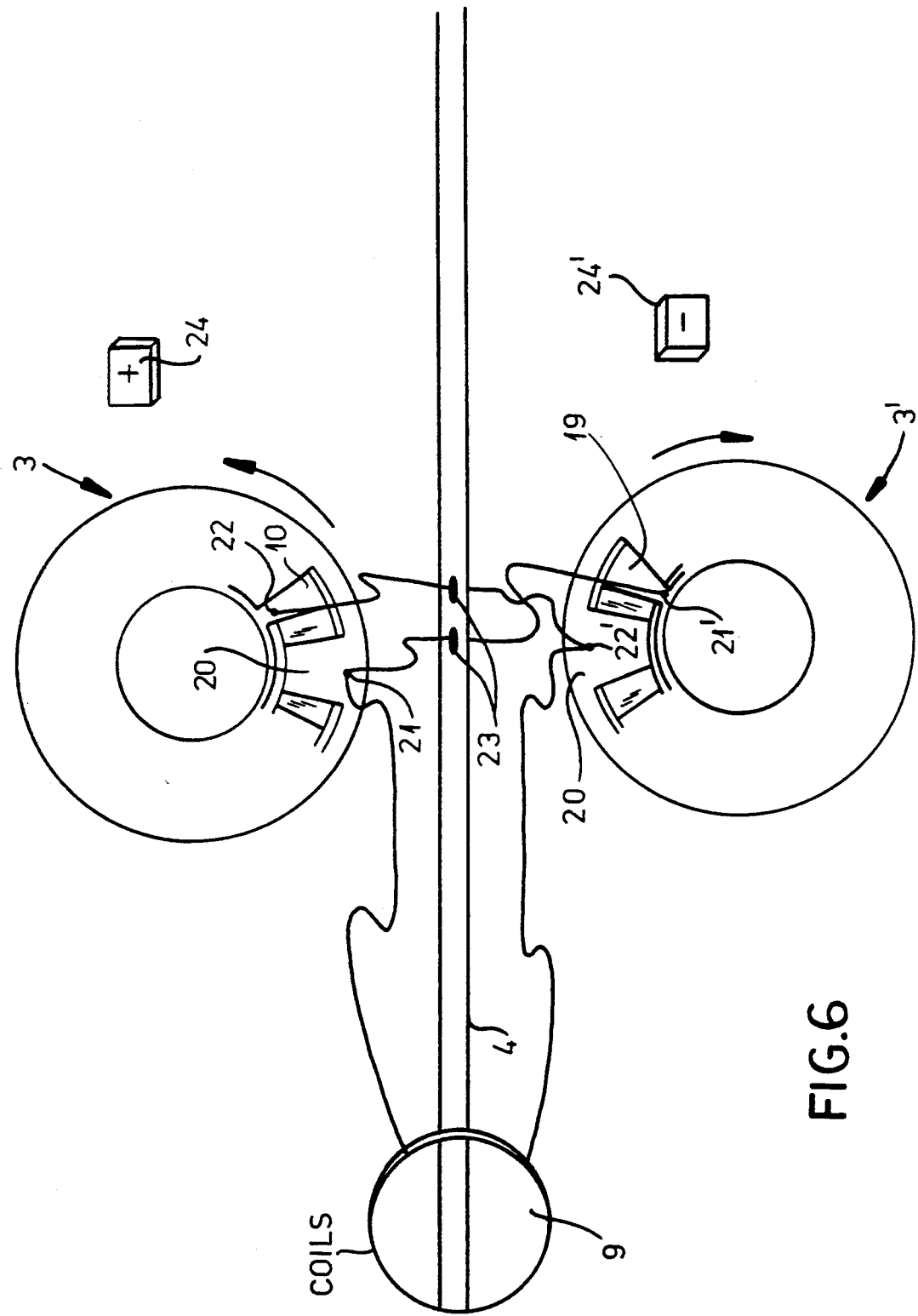
FIG. 6 is a diagram of a commutator disk in accordance with the present invention.

Each of the 19 and 20 of both commutator disks is provided with the respective leads 21 and 22 electrically connected with the helical coils 9 as shown in FIG. 6.

The segments 18 are of two different widths and the width of the zones 20 is not equal to the width of the segments 19, so that the spacing between contacts provided on zones 19 and 20 need not be symmetrical.

Turning now to FIG. 6 two commutators are spaced axially and are juxtaposed with opposite sides of the flywheel 4 formed with holes 23 extending through the latter.

The commutator zones 19 and 20 are so connected with helical coils that poles of the coil are opposite from the poles of the permanent magnets 11 into which the coil is rotating with the flywheel 4. The outer horseshoe magnets alternate in polarity with a north pole being disposed adjacent to a south pole. The north pole of any of the "inner" permanent magnets 11" faces the south pole of the respective radially opposite the "outer" permanent magnet 11 seen in FIG. 2.

A sectional view of the machine along line IV—IV in FIG. 2 is illustrated in FIG. 4 showing the fly wheel 4 rotatable about the axis B and two clusters of magnets, each including five magnets as described in reference to FIG. 3. FIG. 4 illustrates clearly the perpendicular critical relationship between central planes 12 of each of the magnets and the axis of the coil and the axis of rotation B.

As is seen in FIGS. 5 and 6, when the system begins its rotation and the brushes 24 and 24' pass the "neutral" segments 18 (FIG. 5) and enter one of the polarized zones 19 or 20 they effect perfect "timing" of the pulsing of the coils provided that zones having the same width of the opposite commutator disks 3 and 3' are oppositely polarized and consequently the positive contact 21 of the zone 20 formed on the, commutator 3 is connected with the contact 21 of the zone 19 of the opposite commutator 3' and, at the same time, is connected with the respective pole of the coil 9 and vice versa with respect to the negative contact 22 of the commutator disk 3' connected with the contact 22 formed in the zone 19 of the commutator disk 3 and to the oppositely polarized pole of the coils.

It is a matter of choice as to whether the helical coils are electrically connected in series or in parallel, as long as, at any given time, the electric current circulates in all coils in the same direction.

Figure 7:
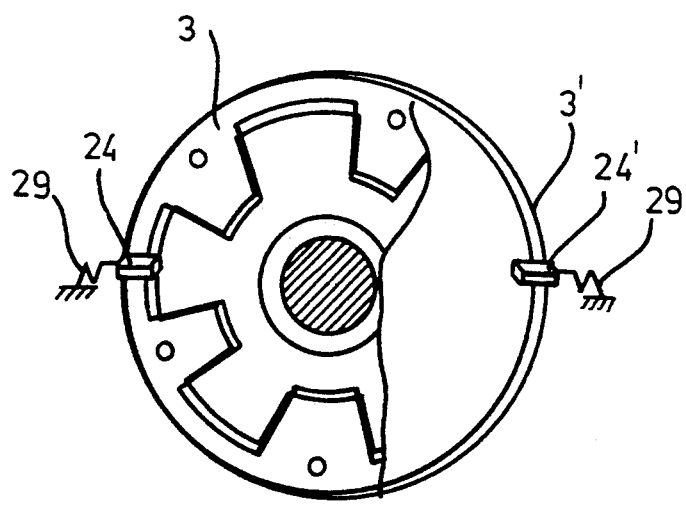
FIG. 7 is a diagram of commutator disks shown with brushes.

As a consequence of the high frequency of revolutions per minute the whole structure experiences considerable vibrational loads. In order to compensate for the vibration. The brushes are preferably mounted on the stator by spring means 29 illustrated in FIG. 7.

Figure 10:
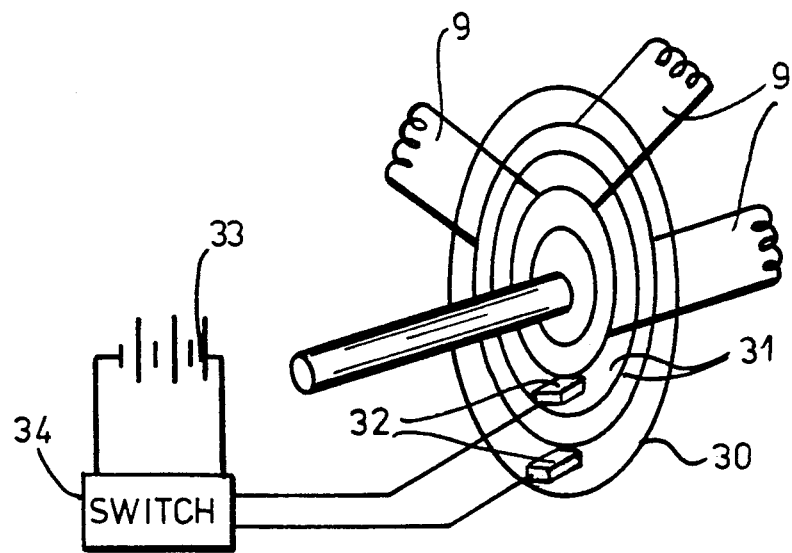
FIG. 10 is a perspective view illustrating a slip ring arrangement of the invention.

Referring now to FIG. 10, which has another system for energizing the coils 9, it can be seen that the rotor disk or fly wheel 30 can be formed with slip rings 31 engaged by brushes 32 of the stator and connected, in turn, to the coils 9 in parallel. The direct current force 33, which can be a battery charged by solar cells is connected to the brushes 32 by a motor control switch 34 which applies pulses to the coils at the desired rate, for example, reversing the polarity of the coils upon rotation of the rotor through substantially 30° to excite the coils at the proper cadence for rotation of the rotor. A sensor of the angular position of the rotor can provide an input to the motor control switch if desired.

Figure 11:
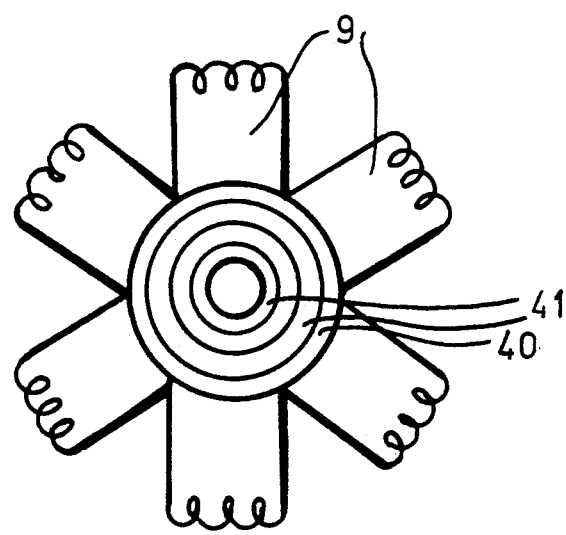
FIG. 11 is a diagram illustrating a series connection of the coils of the invention.

In the embodiment of FIG. 11, the rotor disk 40 is shown to have 2 slip rings 41 which can be engaged by brushes and excited by the circuit illustrated in FIG. 10 but which are connected to the coils 9 which are themselves connected electrically in series.

I claim:

1. An electrical machine, comprising:
   a rotor member rotatable about an axis of rotation;
   a stator member juxtaposed with said rotor member and centered on said axis;
   a helical-turn electromagnet coil on one of said members and having a coil axis lying in a radial plane of said rotor member perpendicular to said axis of rotation and along a chord of a circle in said plane centered on said axis of rotation;
   a cluster of at least two generally horseshoe-shaped permanent magnets on an other of said members and surrounding said coil in one relative angular position of said rotor member and said stator member about said axis of rotation, each of said permanent magnets having a respective transverse central plane perpendicular to the coil axis and to the tangent to said circle in said angular position of the rotor and stator members, said permanent magnets being angularly spaced about said coil axis and lying generally in axial planes thereof with respective poles disposed across said coil from each other in said position having an identical magnetic polarity; and
   conductor means forming an electrical connection to said coil.

2. The electrical machine defined in claim 1 wherein said cluster has at least three generally horseshoe-shaped permanent magnets angularly spaced about said coil axis and lying generally in axial planes thereof with respective poles disposed across said coil from each other in said position having the identical magnetic polarity.

3. The electrical machine defined in claim 2 wherein said cluster has five generally horseshoe-shaped permanent magnets angularly equispaced about said coil axis and lying generally in axial planes thereof with respective poles disposed across said coil from each other in said position having said identical magnetic polarity.

4. The electrical machine defined in claim 1 wherein said one of said members is said rotor member and said other member is said stator member, said means forming said electrical connection includes brushes engaging said rotor member, and said machine is an electric motor.

5. The electrical machine defined in claim 4 wherein said rotor member is provided with a plurality of helical-turn electromagnet coils each having a coil axis lying in said radial plane of said rotor member perpendicular to said axis of rotation, said coils being angularly equispaced from one another about said axis of rotation.

6. The electrical machine defined in claim 5 wherein a plurality of clusters of said permanent magnets are provided on said stator member in angularly equispaced relationship about said axis of rotation so as to be successively traversed by said coils as said rotor member rotates about said axis of rotation.

7. The electrical machine defined in claim 6 wherein the number of said clusters on said stator member is equal to the number of said coils on said rotor member.

8. The electrical machine defined in claim 7 wherein each of said clusters has at least three generally horseshoe-shaped permanent magnets angularly spaced about said coil axis and lying generally in axial planes thereof with respective poles disposed across said coil from each other in said position having the identical magnetic polarity.

9. The electrical machine defined in claim 8 wherein each of said clusters has five generally horseshoe-shaped permanent magnets angularly equispaced about said coil axis and lying generally in axial planes thereof with respective poles disposed access said coil from each other in said position having the identical magnetic polarity.

10. The electrical machine defined in claim 4 wherein the permanent magnets of said cluster lie in an array extending angularly about said coil axis through at least 180°.

11. The electrical machine defined in claim 5 wherein the rotor member is formed with slip rings connected electrically to said coils, said brushes being connected to a solid-state switch timing application of direct current pulses to said coils to drive said rotor member.

12. The electrical machine defined in claim 5 wherein the rotor member is formed with a commutator and said brushes are connected to a direct current source and engage said commutator, said commutator being connected to said coils whereby direct current pulses are applied to said coils to drive said rotor member.

13. The electrical machine defined in claim 5 wherein said coils are electrically connected in parallel.

14. The electrical machine defined in claim 5 wherein each of said permanent magnets has a strength enabling it to support a minimum of 100 pounds.

15. In an electrical machine having two relatively movable parts, the improvement which comprises in combination:
a helical-turn electromagnet coil on one of said parts and having a coil axis lying in a plane; and
a cluster of at least two generally horseshoe-shaped permanent magnets on an the other of said parts and surrounding said coil in one relative position of parts, said permanent magnets being angularly spaced about said coil axis, each of said permanent magnets having a respective transverse central plane perpendicular to the coil axis in said relative position of said parts and lying generally in axial planes thereof with respective poles disposed across said coil from each other in said position having an identical magnetic polarity.

* * * * *